Aug. 31, 1954     J. V. BERNHARDT     2,687,523
LENS CASE FOR WELDER'S HELMETS AND OTHER FACE PROTECTORS
Filed Nov. 6, 1952
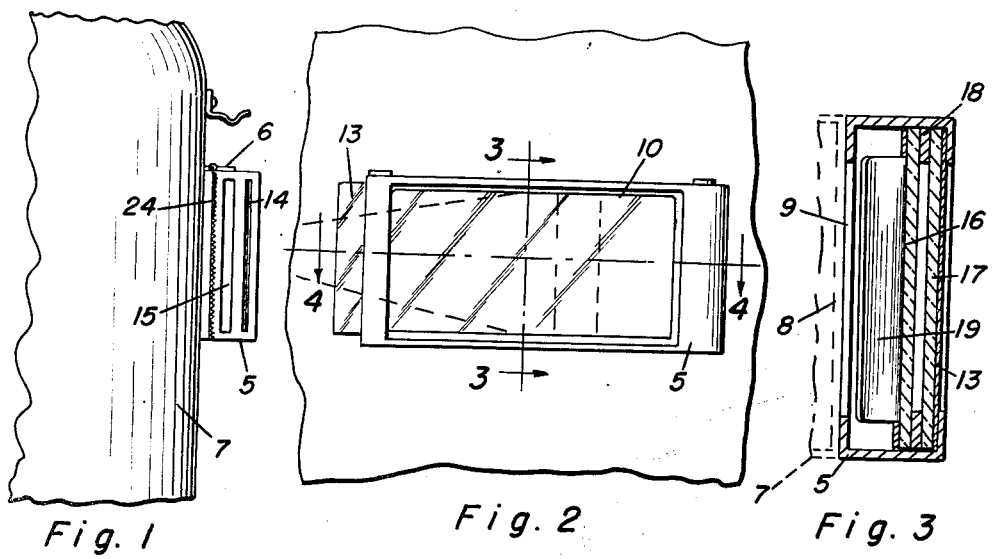
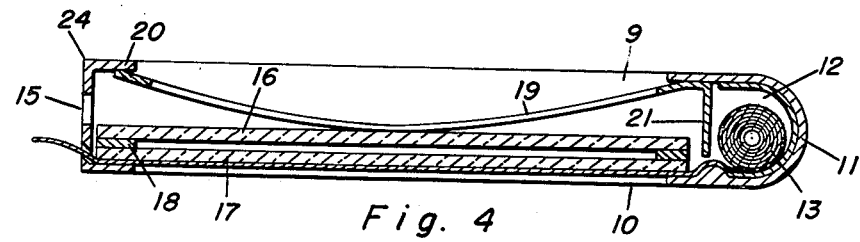
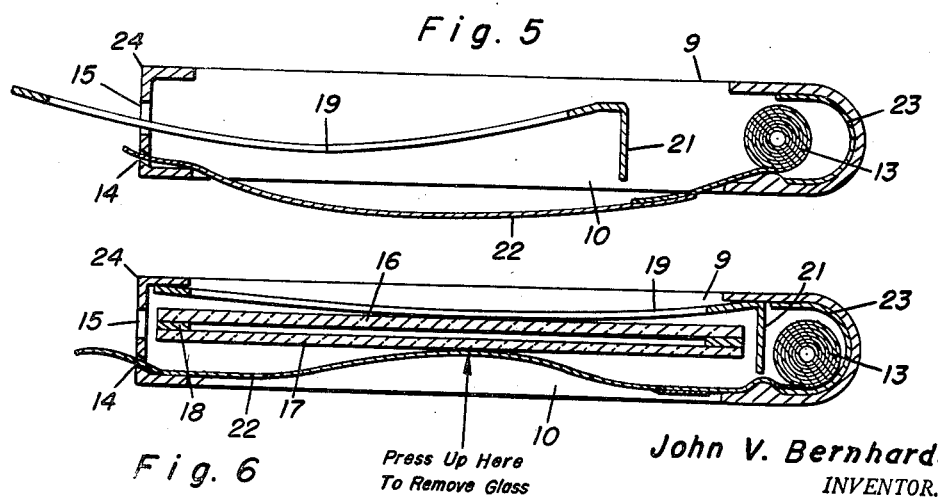
John V. Bernhardt
INVENTOR.

Patented Aug. 31, 1954

2,687,523

UNITED STATES PATENT OFFICE 2,687,523

LENS CASE FOR WELDERS' HELMETS AND OTHER FACE PROTECTORS

John V. Bernhardt, Eagle Mountain, Calif.

Application November 6, 1952, Serial No. 318,981

2 Claims. (Cl. 2—8)

The present invention relates to new and useful improvements in helmets or other face protectors used by welders, and other workmen and more particularly to a lens case for mounting over the window opening of the helmet.

An important object of the invention is to provide a removable transparent film mounted in the case and adapted to cover the lens of the window opening.

Another object of invention is to provide a lens case in which a roll of transparent film as well as the lens mounted in the case may be easily and quickly removed for replenishing the film as well as for treating or replacing the lens when necessary.

A further object is to provide a device of this character of simple and practical construction, which is efficient and reliable in operation, relatively inexpensive to manufacture and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a fragmentary side elevational view of a helmet or face protector showing the lens case in end elevation.

Figure 2 is a front elevational view of the lens case.

Figure 3 is an enlarged transverse sectional view taken on a line 3—3 of Figure 2.

Figure 4 is an enlarged longitudinal sectional view taken on a line 4—4 of Figure 2.

Figure 5 is a similar view with the lens removed and

Figure 6 is a similar view showing the lens moved into a position for removal from the case.

Referring now to the drawings in detail, wherein for the purpose of illustration I have disclosed a preferred embodiment of invention, the numeral 5 designates the lens case of substantially rectangular shape and provided with attaching means 6 for securing the lens case to a welder's helmet or face protector 7, over the window 8 thereof. The rear of the case is formed with a rectangular shaped opening 9 and the front of the case is formed with a front opening 10 coextensive with and aligned with the rear opening 9.

One end of the case 5 is rounded as shown at 11 to provide a transversely extending chamber 12 in which a roll of film 13 may be placed and which is preferably composed of a transparent cellulose sheet such as cellophane or the like, the free end of the sheet being adapted to be pulled across the front opening 10 and outwardly through a slot 14 in the opposite end of the case.

The end of the case provided with the slot 14 is also formed with a substantially larger slot 15 in which a filter lens 16 of glass or other suitable material may be inserted for placing in the case behind the front opening 10 together with a clear glass window 17 and with a cardboard or other suitable spacing frame 18 placed between the lens 16 and clear glass 17.

The lens 16, clear glass 17 and spacing frame 18 are placed in the case 5 separately through the slot 15 and the same are held in assembled confronting relation with respect to each other in the case by means of a frame 19 of spring-steel or other suitable material tensionally held against the flange 20 at the rear of the case.

One end of the frame 19 is formed with a right angularly extending flange 21 which forms a partition closing the chamber 12 to hold the roll of film 13 therein.

The roll of film may be provided at its free end with a pull tab 22 to facilitate the initial feeding of the film through the slot 14 and the chamber 12 is preferably lined with a cloth tape 23 or other suitable non-abrasive material to prevent scratching of the film as it is unrolled in the chamber.

In the operation of the device, the roll of film 13 is first placed in the chamber 12 and drawn across the front opening 10 by the pull tab 22 which is fed through the slot 14 to cover the front opening. The spring frame 19 is then inserted through the slot or opening 15 to hold the roll of film in the chamber 12 and the clear glass 17, spacing frame 18 and lens 16 are then separately inserted through the slot 15, in the order named, and held in the case behind the film 13 by the spring frame 19, as shown in Figure 4 of the drawings.

As the transparency of the film 13 becomes impaired the used section of the film is pulled outwardly through the slot 14 to bring a fresh section of the film into position and the used section may then be severed by tearing the same across a sharpened corner 24 at the end of the case adjacent the slots 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A lens case comprising a rectangular body having aligned front and rear openings, an inturned rear transverse flange at one end, and its opposite end rounded and return bent and forming a rear transverse flange and a transverse chamber at said opposite end, said chamber opening inwardly of said body, a roll of transparent film in said chamber adapted for unrolling past the front opening, said body having a transverse slot in the first named end through which the free end of the film is withdrawn, a lens in said body behind the film, and a spring member in said body behind said lens bearing against said flanges and lens to hold said lens against the film and extending into said chamber to hold the roll of film in the chamber.

2. A lens case according to claim 1, said spring member comprising a rectangular frame having an end flange extending into said chamber and partly closing the chamber to hold the roll of film.

References Cited in the file of this patent

UNITED STATES PATENTS

| Number | Name | Date |
|---|---|---|
| 1,969,710 | Jones | Aug. 7, 1934 |
| 2,119,439 | Parmelee | May 31, 1938 |
| 2,152,865 | Bowers | Apr. 4, 1939 |
| 2,186,817 | Bowers | Jan. 9, 1940 |
| 2,592,805 | Hutchinson | Apr. 15, 1952 |